3,549,674
STEROID ESTROGEN SULFATES AND METHODS
OF PREPARING THE SAME
Joseph Peter Joseph, Cliffside Park, N.J., John Paul
Dusza, Nanuet, and Seymour Bernstein, New City,
N.Y., assignors to American Cyanamid Company,
Stamford, Conn., a corporation of Maine
No Drawing. Filed Mar. 4, 1969, Ser. No. 804,285
Int. Cl. C07c *169/08*
U.S. Cl. 260—397.5                                      10 Claims

ABSTRACT OF THE DISCLOSURE

The preparation of aromatic steroid triethylammonium sulfate salts by reacting astradiol or estriol with sulfur trioxide-triethylamine in an anhydrous solvent, is described. These steroid salts are useful as estrogenic agents.

DESCRIPTION OF THE INVENTION

This invention relates to new steroid compounds. More particularly, it relates to aromatic steroid triethylammonium sulfate salts and methods of preparing the same.

The novel steroid salts of this invention may be illustrated by the following formula:

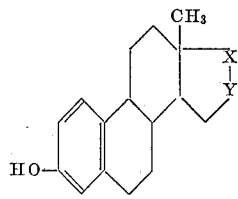

wherein —X—Y— is selected from the group consisting of

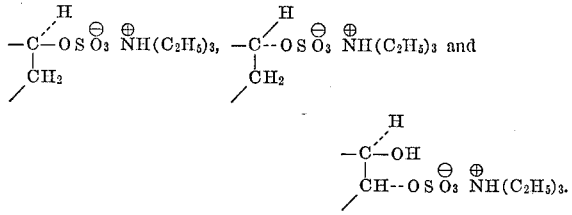

The steroid salts of the present invention are solids having well defined melting points. They are more water soluble than the steroids from which they are prepared, such as estradiol and estriol.

The compounds of the present invention are prepared by several methods for example, by reacting estradiol or estriol with sulfur trioxide-triethylamine in an anhydrous solvent such as pyridine. The reaction will take place at a temperature within the range of from 10° to 100° C. over a period of from 10 minutes to 24 hours. The major product obtained when estradiol is used is the 17β-sulfooxy triethylammonium salt and when estriol is used, the 16α-sulfooxy triethylammonium salt.

The present compounds can also be prepared by a fusion process using estradiol or estriol with sulfur trioxide-triethylamine. The fusion process is carried out at a temperature of 160° C. to 250° C. for a period of from 5 minutes to 30 minutes. The products obtained are identical with those obtained when the reaction is carried out in an anhydrous solvent.

A still further method of preparing the present compounds is the fusion reaction of an estriol-3-sulfate triethylammonium salt or estradiol-3-sulfate triethylammonium salt. This reaction is carried out by merely heating the compounds at a temperature of from 140° C. to 250° C. for from 5 minutes to 20 minutes. The fusion causes the shift of the 3-sulfate triethylammonium salt to the 17-position in the estradiol derivative, and to the 16α-position in the estriol derivative. The fusion reaction can also be carried out wherein 17β-estradiol and 3-sulfooxy-estra-1,3,5(10)-triene triethylammonium salt are fused to produce 17β-sulfooxyestra-1,3,5(10)-trien-3-ol triethylammonium salt.

The present compounds can also be obtained by removal of a 3-lower alkanoyl group from compounds, such as for example, 3-acetoxy-17β-sulfooxyestra-1,3,5(10)-triene triethylamine, 3-acetoxy-16α-sulfooxyestra - 1,3, 5(10)-trien-17β-ol triethylamine, and the like, by heating with triethylamine in the presence of solvents such as alcohols. This hydrolysis method produces the present compounds without affecting the triethylammonium sulfate groups present.

The present compounds are useful as estrogenic agents. They may be used in estrogen replacement therapy in the form of tablets, capsules, pills, solutions and the like. They can also be used parenterally in the form of sterile solutions or suspensions.

DETAILED DESCRIPTION

The following examples describe in detail the preparation of representative compounds of this invention.

EXAMPLE 1

Preparation of 17β-sulfooxyestra-1,3,5(10)-trien-3-ol triethylammonium salt (a) From 17β-estradiol in pyridine solvent:

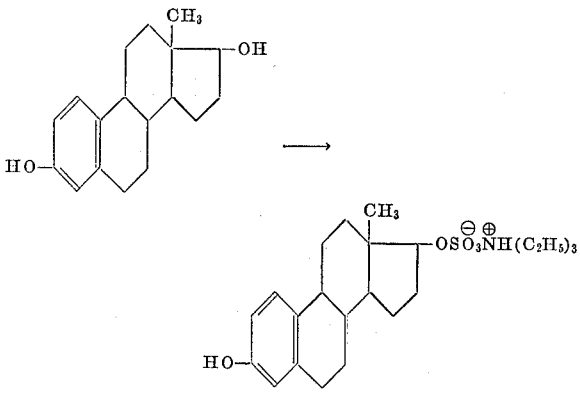

To a solution of estra-1,3,5(10)-triene-3,17β-diol (2.0 g.) in dry pyridine (12 ml.) is added recrystallized sulfur trioxide-triethylamine (1.47 g., 1.1 eq.). After two hours at room temperature, the reaction mixture is poured into anhydrous ether, and an oil separates. The solution is decanted, more anhydrous ether is added and this process repeated once again yielding a solid (2.02 g.). Thin layer chromatographic analysis indicated some 17β-estradiol, a trace of disulfate but mostly a monosulfate. The solid is dissolved in methylene chloride and passed through a short pad of hydrous magnesium silicate with additional methylene chloride (400 ml.). The gradual addition of anhydrous ether to the refluxing methylene chloride solution results in the precipitation of the salt (0.8 g.). Additional quantities of this material is obtained by further concentration of the mother liquor. The analytical sample melts at 200°–201° C.

(b) From 17β-estradiol by fusion: A mixture of estra-1,3,5(10) - triene - 3,17β - diol (2.0 g.) and recrystallized sulfur trioxide-triethylamine (1.45 g.) are mixed together in a test tube. The test tube is inserted into an oil bath whose temperature is 160° C. The tube is kept in the bath approximately 5 minutes by which time the temperature of the bath has reached 180° C. The contents of the tube melts to a clear melt and then resolidifies (in bath). The test tube is cooled and methylene chloride is added to dissolve the reaction mixture. In order to get a one phase system the final volume of methylene chloride is increased to 125 milliliters. Refluxing this solution with the addition of anhydrous ether gives an initial crystalline precipitation of product (1.70 g.), melting point 198°–200° C. Three subsequent concentrations of the mother liquor precipitates an additional amount (1.52 g.) of comparable quality material.

(c) From 17β-estradiol by fusion:

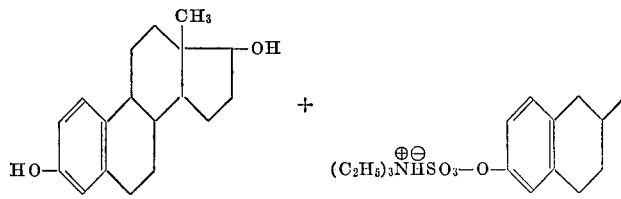

A mixture of estra-1,3,5(10)-triene-3,17β-diol (0.20 g.) and 3-sulfooxyestra-1,3,5(10)-triene triethylammonium salt (0.38 g.) is heated together in a test tube in the range 140–150° C. for 10 minutes and then cooled to give a glass. Anhydrous ether is added and the crystalline residue is identified as estradiol 17-monosulfate triethylammonium salt by its infrared spectrum. Recrystallization of this material from methylene chloride-anhydrous ether gives the salt 75 mg., melting point 201–202° C.

(d) From 17β-estradiol-3-sulfate triethylammonium salt by fusion:

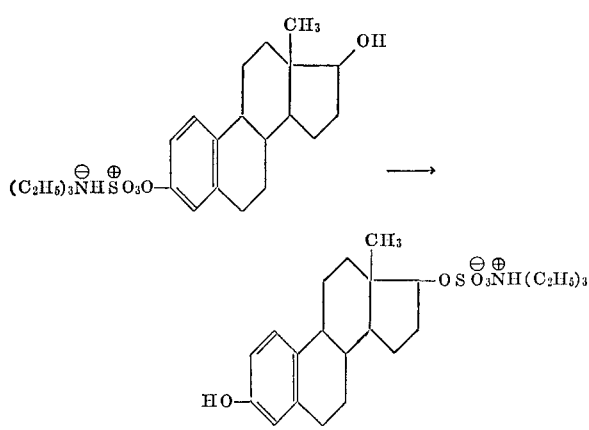

To 15 ml. of 88% formic acid there is added 1.0 g. of 17β-estradiol. The solution is heated on a steam-bath for one hour and is evaporated under reduced pressure to provide a gum. Methylene chloride is added to the gum and then removed under reduced pressure several times and finally anhydrous ether is added to the residue whereupon the gum crystallized. The solid is collected and dried to give 1.0 g. of 17β-estradiol-17-formate. A sample is removed for recrystallization from methylene chloride-hexane, melting point 154–155° C.

In 1 ml. of pyridine there is dissolved 400 mg. of 17β-estradiol-17-formate and 288 mg. of triethylamine-sulfur trioxide. The solution is allowed to remain overnight at room temperature, and is then poured into ether. The resulting gum, estradiol-3-triethylammonium sulfate-17-formate, did not readily crystallize, and is dissolved in 5.0 ml. of methanol and 0.5 ml. of triethylamine. The solution is refluxed for 5 hours and evaporated under reduced pressure to leave a gum (270 mg.) which crystallized on trituration with an hydrous ether. Recrystallization from methylene chloride-ether gives the desired compound, melting point 148°–150° C.

3-Sulfooxyestra-1,3,5(10) - trien - 17β-ol triethylammonium salt (101 mg.) is heated in a test tube at 140–170° C. over a period of 15 minutes. The material first melts and then resolidifies. The cooled solid shows a minor trace of estra - 1,3,5(10) - triene - 3,17β - diol on thin layer chromatography analysis but mostly a monosulfate, melting point 190–192° C. Recrystallization of this material from methylene chloride-anhydrous ether gives the 17-sulfate (58 mg.), melting point 198°–200° C., identical to an authentic sample.

(e) From 17β-estradiol-3-acetate-17β-triethylammonium salt:

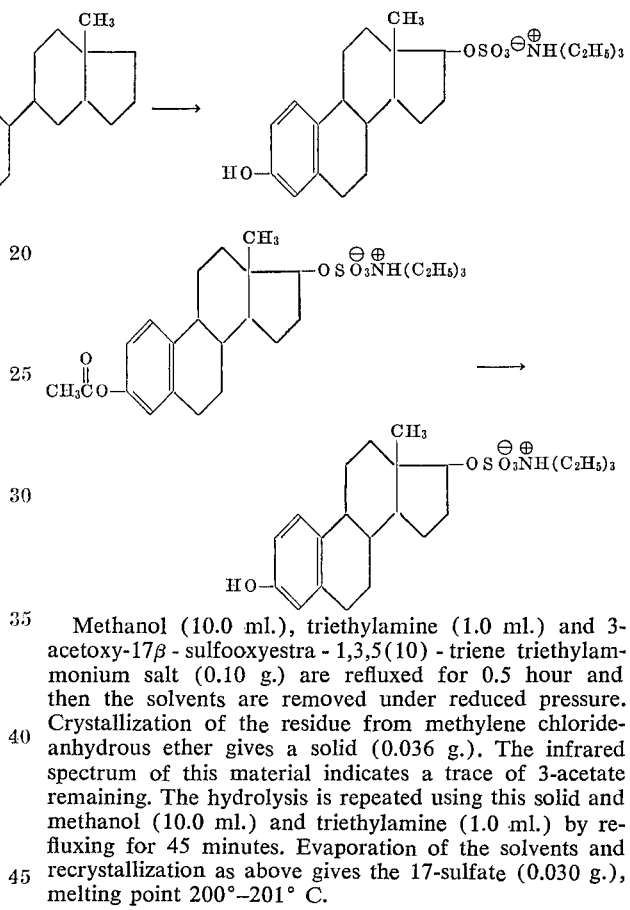

Methanol (10.0 ml.), triethylamine (1.0 ml.) and 3-acetoxy-17β - sulfooxyestra - 1,3,5(10) - triene triethylammonium salt (0.10 g.) are refluxed for 0.5 hour and then the solvents are removed under reduced pressure. Crystallization of the residue from methylene chloride-anhydrous ether gives a solid (0.036 g.). The infrared spectrum of this material indicates a trace of 3-acetate remaining. The hydrolysis is repeated using this solid and methanol (10.0 ml.) and triethylamine (1.0 ml.) by refluxing for 45 minutes. Evaporation of the solvents and recrystallization as above gives the 17-sulfate (0.030 g.), melting point 200°–201° C.

EXAMPLE 2

Preparation of 3 - acetoxy - 17β - sulfooxyestra-1,3,5(10)-triene triethylammonium salt (a) From 17β-estradiol:

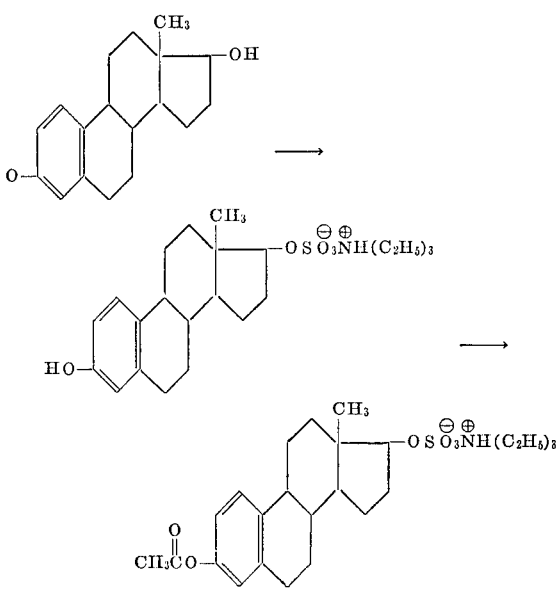

The sulfation of estra-1,3,5(10)-triene-3,17β-diol (2.0 g.) in dry pyridine (12 ml.) with sulfur trioxide-triethylamine (1.47 g.) is allowed to proceed for 2 hours at room temperature and then acetic anhydride (1.0 ml.) is added. After standing overnight at room temperature the reaction mixture is poured into anhydrous ether to give a solid which is filtered and dried. Solution of the solid in methylene chloride and passage through a short pad of hydrous magnesium silicate followed by an additional 200 ml. of solvent afforded a filtrate which deposits the desired 3-acetate-17-sulfate (2.50 g., melting point 166–167° C.) on the addition of anhydrous ether. The addition of more ether afforded additional material (0.22 g.) melting point 165°–166° C. Recrystallization from methylene chloride-anhydrous ether gives an analytical sample (2.02 g.), melting point 171°–172° C.

The stepwise addition of the two reagents, sulfur trioxide-triethylamine and acetic anhydride is not required to obtain the 3-acetate-17-sulfate since in a subsequent experiment when estradiol, in pyridine and the two reagents in pyridine were combined, an equally good yield of the 17-sulfate-3-acetate is obtained.

EXAMPLE 3

Preparation of 3-acetoxy-17β-sulfooxyestra-1,3,5(10)-triene-triethylammonium salt

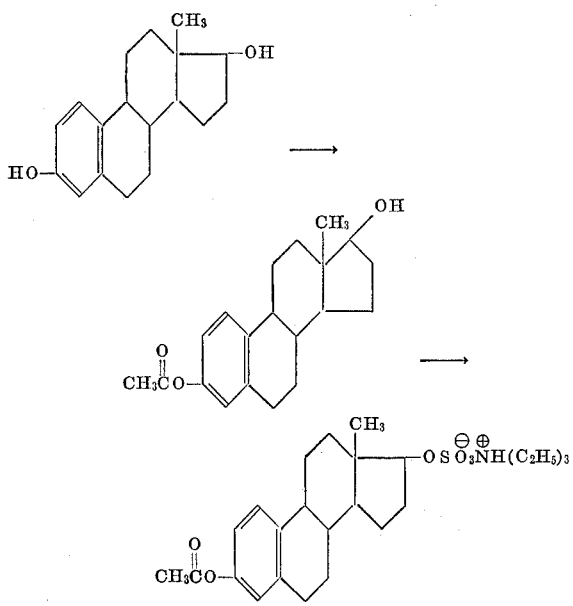

Estra-1,3,5(10)-triene-3,17β-diol (1.0 g.) is dissolved in acetone (20 ml.) and this solution is added to an aqueous 0.5 N sodium hydroxide solution (500 ml.). The reaction mixture is cooled to 0–5° C. and acetic anhydride (12 ml.) is added. After *vigorously stirring* this reaction mixture for 5 minutes, the precipitated material is collected by filtration. The solid is dissolved in a minimum volume of methylene chloride and passed through a short hydrous magnesium silicate pad with additional methylene chloride passed through. Evaporation of the total filtrate and recrystallization of the solid from hexane gives the 3-monoacetate (1.02 g.), melting point 142°–143° C.

Reported melting point 136.5–137.5° (K. Miescher and C. Scholz, Helv. Chim. Acta, 20, 263 (1937)); reported melting point 141–142°, $[\alpha]_D +58°$ (dioxane), $\lambda_{max.}^{ethanol}$ 269 and 275 Mμ ($\epsilon$ 768, 762) [H. Fex, K-E Lundvall, and A. Olsson, Acta. Chem. Scand. 22, 254 (1968)].

After remaining 3 hours at room temperature, a reaction mixture of 3-acetoxyestra-1,3,5(10)-trien-17β-ol (0.75 g.), sulfur trioxide-triethylamine (0.53 g.) in dry pyridine (2.0 ml.) is poured into anhydrous ether. The solid collected on filtration is dissolved in a minimum volume of methylene chloride and passed through a short pad of hydrous magnesium silicate with additional methylene chloride (200 ml.). The entire filtrate is brought to reflux and anhydrous ether gradually added until crystalline material begins to separate. The solution is cooled and the 3-acetate-17-sulfate (0.66 g.), melting point 166° C.–167° C. is collected by filtration. Slight concentration of the filtrate afforded additional product (0.33 g.). This material is identical to the compound prepared from the acetylation of the monosulfation product of estradiol.

EXAMPLE 4

Preparation of 16α-sulfooxyestra-1,3,5(10)-triene-3-17β-diol triethylammonium salt (a) From estriol:

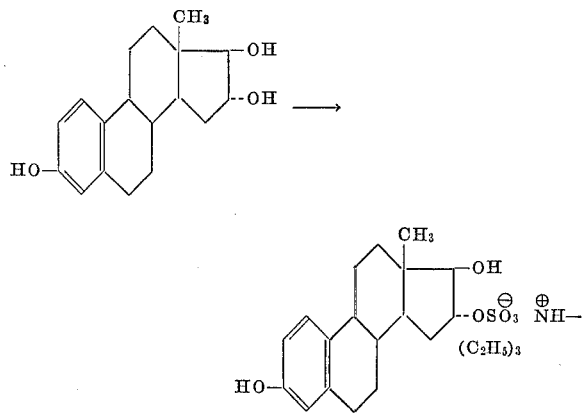

A solution of estriol, [estra-1,3,5(10)-triene-3,16α-17β-triol] (0.5 g.) in dry pyridine (10 ml.) is stirred rapidly and a solution of sulfur trioxide-triethylamine (0.314 g.) in dry pyridine (5 ml.) is added dropwise over a period of 30 minutes. The stirring is continued for 1 hour longer, and then the reaction mixture is poured into anhydrous ether giving an oily residue. The solvents are decanted and additional anhydrous ether is added. After being decanted again, and treated with additional ether, this material is refrigerated overnight. Removal of the ether gives a solid which when examined by thin layer chromatography showed mostly monosulfate with trace quantities of starting material and disulfate. Crystallization from methanol-anhydrous ether removed the trace impurities, and the material (0.14 g.) melting point 150°–151° C. is recrystallized to yield an analytical sample (0.08 g.) melting point 160–163° C.

(b) From estriol by fusion:

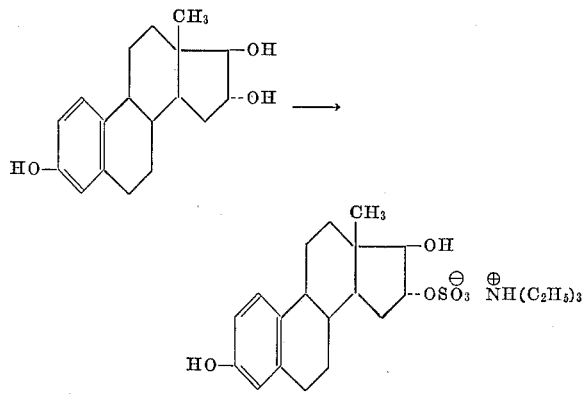

An intimate mixture of estriol (estra-1,3,5(10)-triene-3,16α,17β-triol) (0.288 g.) and sulfur trioxide-triethylamine (0.181 g.) is placed in a test tube and immersed in an oil bath heated at 180–190° C. for 10 minutes giving a clear melt. After cooling, the glass is dissolved in a methylene chloride (2)-acetone (1) solution and passed through a short hydrous magnesium silicate column followed by additional solution. The combined filtrate is refluxed and anhydrous ether is added to turbidity. On cooling, a crystalline precipitate (0.205 g.), melting point 165°–167° C. is obtained. The identity of this material is confirmed by the infrared and nmr analysis.

(c) From estriol-3-sulfate triethylammonium salt by fusion:

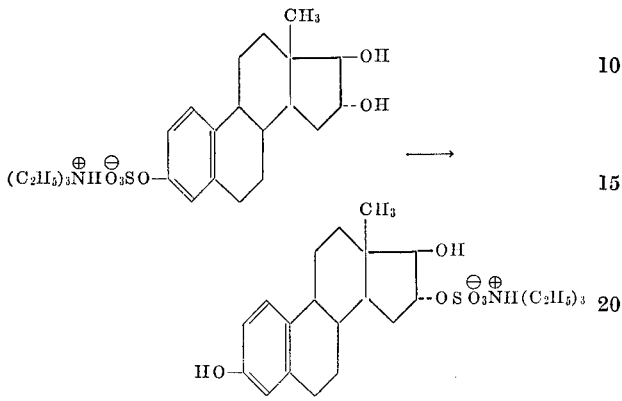

A reaction mixture of estriol (0.10 g.), 88% formic acid (2 ml.) and p-toluenesulfonic acid (0.01 g.) is heated on a steam bath for 5 minutes and then allowed to stand overnight at room temperature. A few drops of pyridine are added, and the entire reaction mixture is poured into water and filtered. The resultant solid is dissolved in methylene chloride and passed through a short pad of hydrous magnesium silicate. The solvent is evaporated to give crystals which are recrystallized twice to provide the 16,17-diformate (0.068 g.), melting point 177–178.5°, $[\alpha]_D^{25} -22.7°$ (CHCl$_3$)

$\lambda_{max.}^{methanol}$ 282 and 288 m$\mu$ ($\epsilon$ 2160 and 1890 respectively).

A solution of estriol-16,17-diformate (0.5 g.) and triethylamine-sulfur trioxide complex [0.29 g. (1.1 equiv.)] in dry pyridine (2.0 ml.) is allowed to stand overnight at room temperature. On pouring into anhydrous ether, an oil is obtained from which the solvent is decanted. The oil is dissolved in methylene chloride and passed through a short pad of hydrous magnesium silicate, and the resultant methylene chloride solution is evaporated to give 0.41 g. of triethylammonium estriol-16,17-diformyl-2-sulfate as a glass.

The glass is refluxed for 1 hour in a solution of methanol (10 ml.) and triethylamine (1.0 ml.), and then the entire reaction mixture is evaporated to give a crystalline residue (0.35 g.). Several recrystallizations from acetone-hexane gives the desired product (0.15 g.), melting point 137°–138° C., $[\alpha]_D^{25} +28.1°$ (CHCl$_3$), $\lambda_{max.}^{methanol}$ 270 and 276 m$\mu$ ($\epsilon$ 1175 and 1010 respectively).

A test tube containing estriol-3-sulfate triethylammonium salt [3-sulfooxyestra-1,3,5(10)-triene-16$\alpha$,17$\beta$-diol triethylammonium salt] (0.20 g.) is inserted in an oil bath at 165° C. The solid gradually turned to a clear melt and after five minutes, the test tube is removed from the bath at which time the temperature reads 185° C. After cooling, the glass is dissolved in acetone (2 ml.) and diluted with methylene chloride (6 ml.). This solution is passed through a very thin pad of hydrous magnesium silicate and the pad further washed with a solution of acetone (4 ml.)-methylene chloride (12 ml.). The combined eluate is refluxed and anhydrous ether added. The compound oiled from solution and then slowly crystallizes (0.11 g.), when a seed crystal is added, melting point 165°–168° C. The infrared spectrum of this material is identical to the previously prepared standard.

EXAMPLE 5

Preparation of 17$\alpha$-sulfooxyestra-1,3,5(10) trien-3-ol triethylammonium salt

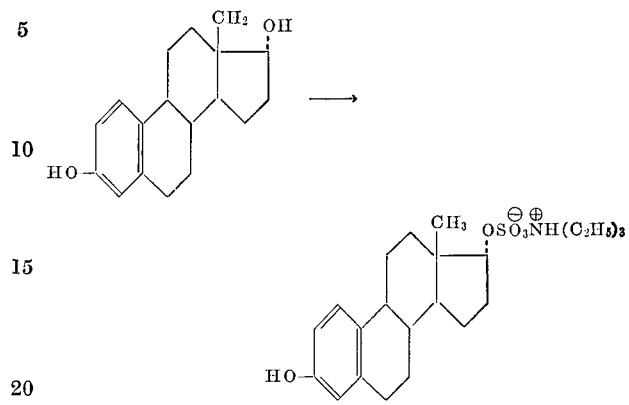

To a solution of estra-1,3,5(10)-triene-3,17$\alpha$-diol (0.5 g.) in dry pyridine (1.5 ml.) is added recrystallized sulfur trioxidetriethylamine (0.37 g.). After remaining overnight at room temperature, the reaction mixture is poured into anhydrous ether, and an oil separates. The solution is decanted, more anhydrous ether is added and this process repeated once again to yield a solid. The solid is dissolved in methylene chloride and passed through a short pad of anhydrous magnesium silicate with additional methylene chloride passed through the absorbent pad. The combined effluent is brought to reflux and anhydrous ether is gradually added to the point of turbidity. On cooling the desired sulfate, triethylammonium salt slowly crystallizes (0.15 g.), melting point 173°–175° C.

What is claimed is:

1. A compound of the formula:

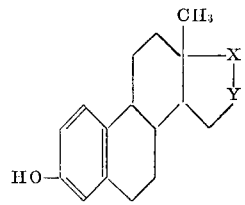

wherein —X—Y— is selected from the group consisting of

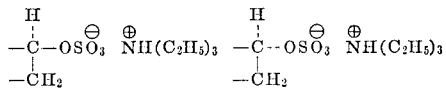

and

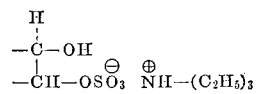

2. The compound in accordance with claim 1, 17$\beta$-sulfooxyestra-1,3,5(10)-triene-3$\beta$-ol triethylammonium salt.

3. The compound in accordance with claim 1, 16$\alpha$-sulfooxyestra-1,3,5(10)-triene-3,17$\beta$ - diol triethylammonium salt.

4. The compound in accordance with claim 1, 17$\alpha$-sulfooxyestra-1,3,5(10)-trien-3-ol triethylammonium salt.

5. A method of preparing a compound of the formula:

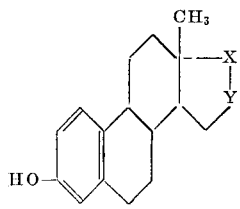

wherein —X—Y— is selected from the group consisting of

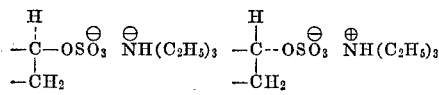
and

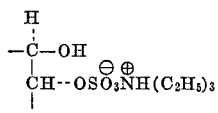

which comprises reacting a compound of the formula:

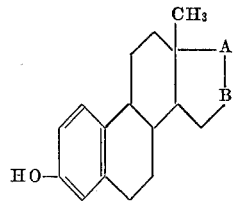

wherein —A—B— is selected from the group consisting of

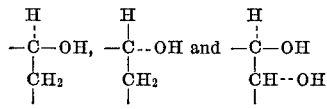

with sulfur trioxidetriethylamine in the presence of an anhydrous solvent at a temperature within the range of 10° C. to 100° C. and recovering said compounds therefrom.

6. A method in accordance with claim 5, in which the starting material is estra-1,3,5(10)-triene-3,17β-diol and the product obtained is 17β-sulfooxyestra-1,3,5(10)-trien-3-ol triethylammonium salt.

7. A method of preparing compounds of the formula:

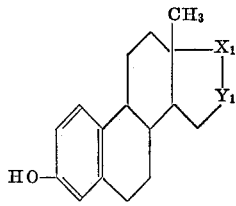

wherein —$X_1$—$Y_1$— is selected from the group consisting of

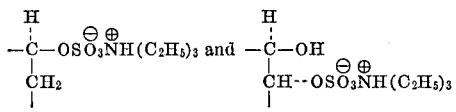

which comprises fusing a compound of the formula:

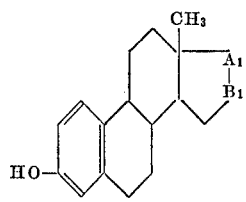

wherein —$A_1$—$B_1$— is selected from the group consisting of

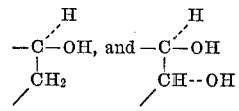

with sulfur trioxide triethylamine at a temperature within the range of 160° C. to 250° C. for from 5 to 30 minutes and recovering said compounds therefrom.

8. A method of preparing compounds of the formula:

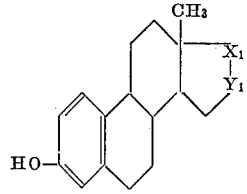

wherein —$X_1$—$Y_1$— is selected from the group consisting of

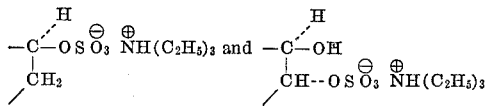

which comprises heating a compound of the formula:

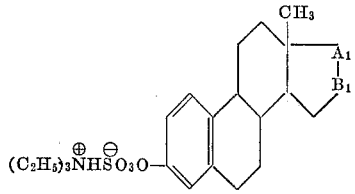

wherein —$A_1$—$B_1$— is selected from the group consisting of

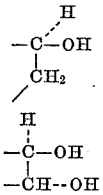

at a temperature within the range of from about 140° C. to about 250° C. for from 5 minutes to 20 minutes and recovering said compound therefrom.

9. A method in accordance with claim 7, in which the starting material is 3-sulfooxyestra-1,3,5(10)-trien-17β-ol and the product obtained is 17β-sulfooxyestra-1,3,5(10)-trien-3-ol triethylammonium salt.

10. A method in accordance with claim 7, in which the starting material is 3-sulfooxyestra-1,3,5(10)-triene-16α,17β-diol triethylammonium salt and the product obtained is 16α-sulfooxyestra-1,3,5(10)-triene - 3,17β - diol triethylammonium salt.

References Cited
UNITED STATES PATENTS 2,534,121   12/1950   Grant et al.
2,835,681   5/1958   Allais et al.

HENRY A. FRENCH, Primary Examiner

U.S. Cl. X.R.
260—999